United States Patent
Verdegan et al.

(10) Patent No.: US 9,500,167 B2
(45) Date of Patent: Nov. 22, 2016

(54) FILTER ELEMENT WITH A COMBINED ENDPLATE/LID WITH A CENTRAL HOLE

(71) Applicant: CUMMINS FILTRATION IP, INC., Minneapolis, MN (US)

(72) Inventors: Barry M. Verdegan, Stoughton, WI (US); Amit Dhingra, McFarland, WI (US); Jerald Moy, Oregon, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 595 days.

(21) Appl. No.: 13/959,020

(22) Filed: Aug. 5, 2013

(65) Prior Publication Data

US 2014/0034566 A1 Feb. 6, 2014

Related U.S. Application Data

(60) Provisional application No. 61/679,866, filed on Aug. 6, 2012.

(51) Int. Cl.
*F02M 37/22* (2006.01)
*B01D 36/00* (2006.01)
*B01D 35/30* (2006.01)

(52) U.S. Cl.
CPC ............ *F02M 37/22* (2013.01); *B01D 36/001* (2013.01); *B01D 2201/316* (2013.01)

(58) Field of Classification Search
CPC ............ F02M 37/22; B01D 2201/316; B01D 2201/291; B01D 2201/301; B01D 36/001; B01D 35/30

USPC .......... 210/232, 450, 493.2, 437, 436, 242.1, 210/454

See application file for complete search history.

(56) References Cited

U.S. PATENT DOCUMENTS

| | | | |
|---|---|---|---|
| 5,490,930 A | 2/1996 | Krull | |
| 5,556,542 A | 9/1996 | Berman et al. | |
| 5,670,042 A * | 9/1997 | Clausen | B01D 29/114 210/238 |
| 5,830,348 A * | 11/1998 | Vannoy | B01D 27/005 210/109 |
| 6,113,781 A * | 9/2000 | Popoff | B01D 27/07 210/234 |
| 2003/0146143 A1 | 8/2003 | Roll et al. | |
| 2011/0259808 A1 * | 10/2011 | Oelschlaegel | B01D 35/153 210/232 |

FOREIGN PATENT DOCUMENTS

EP 0 718 021 A2 6/1996

OTHER PUBLICATIONS

International Search Report for PCT Application No. PCT/US2013/053727, dated Nov. 13, 2013, 2 pages.

* cited by examiner

*Primary Examiner* — Madeline Gonzalez
(74) *Attorney, Agent, or Firm* — Foley & Lardner LLP

(57) ABSTRACT

A filter element is described that includes an endplate that also serves as the lid or cover for the filter housing. The combined endplate/lid includes a central hole that is closed to fluid flow when the proper filter element-housing combination is used. Various embodiments for different functional uses of the central hole are also described.

17 Claims, 4 Drawing Sheets

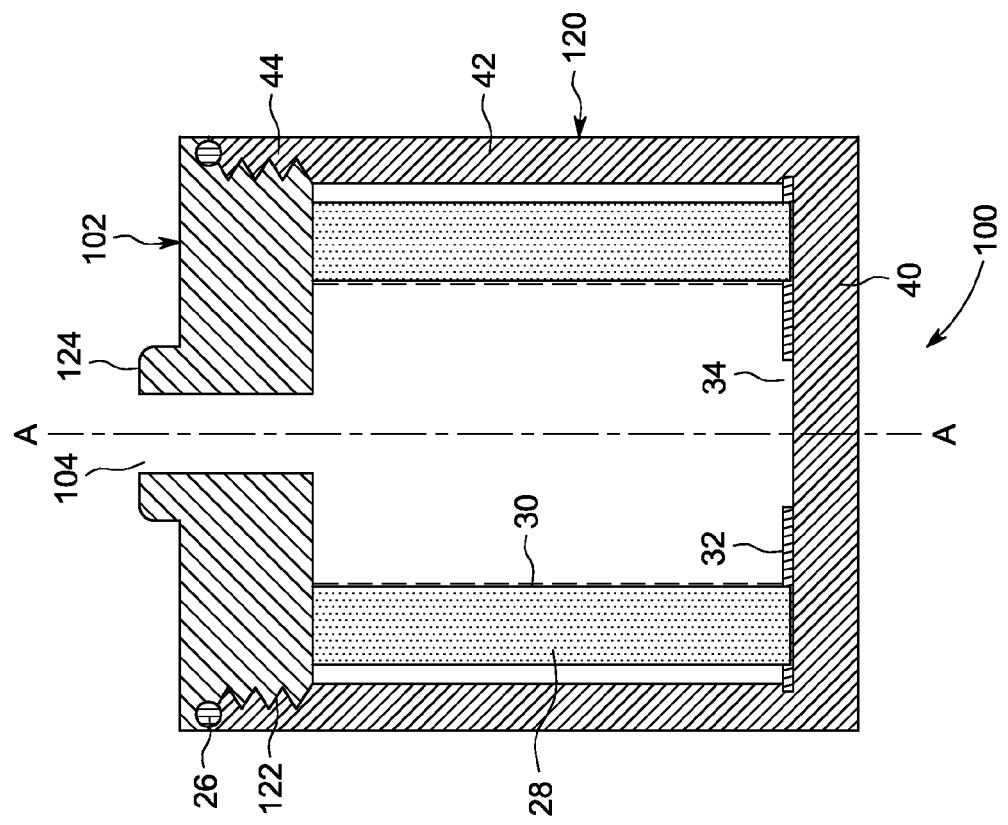
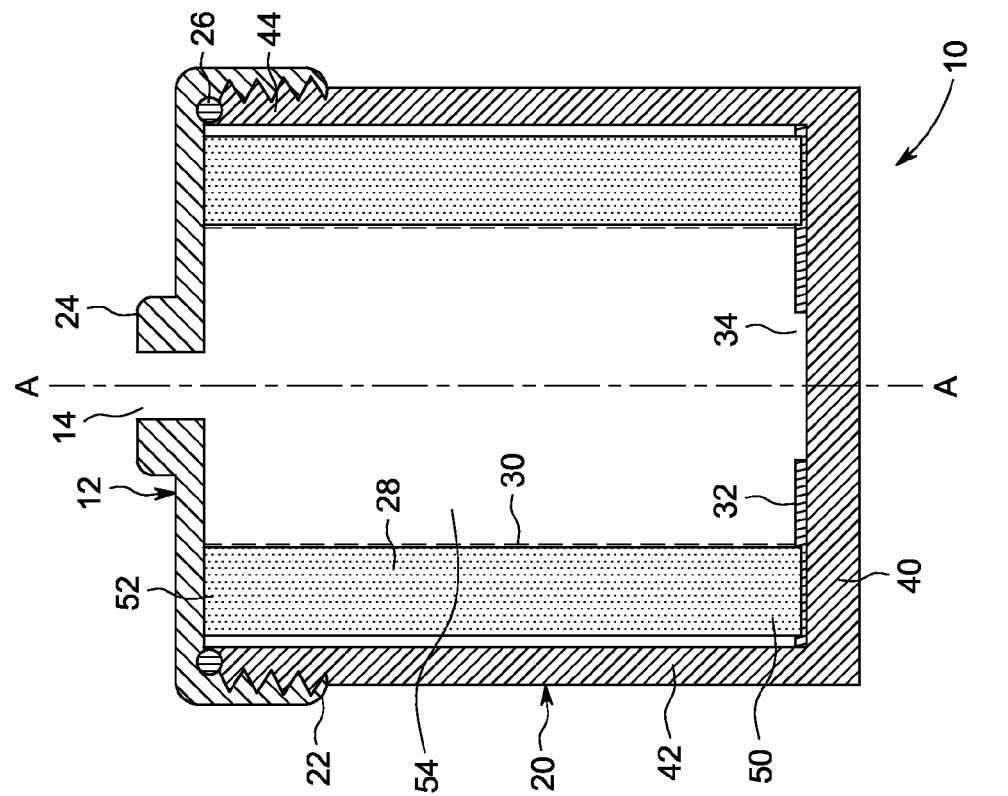

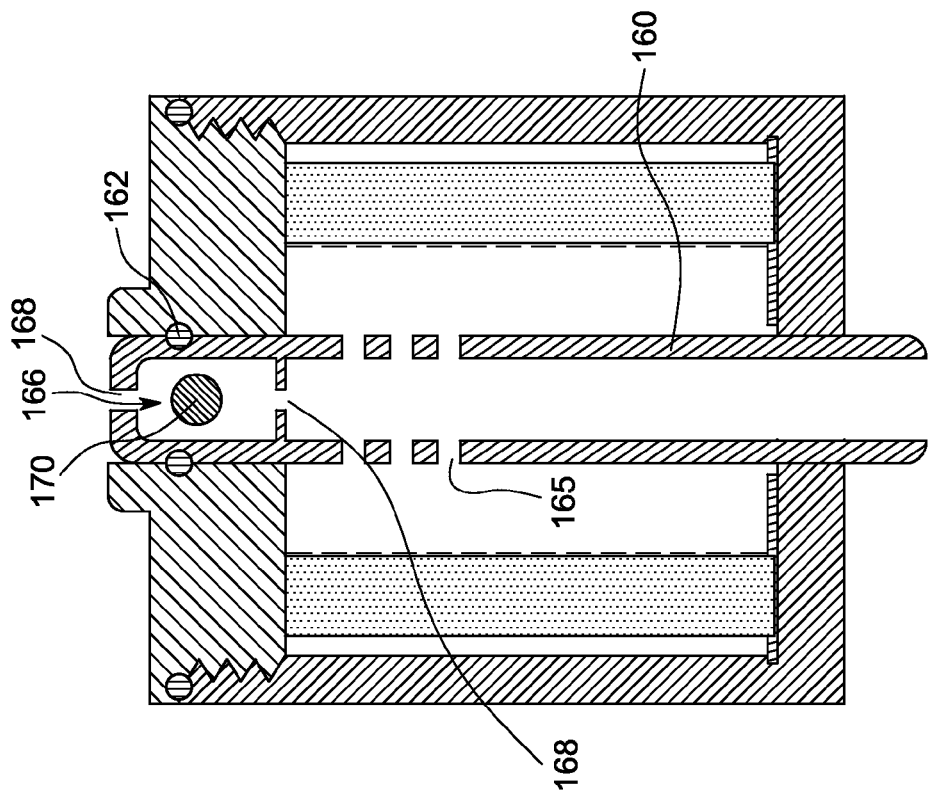
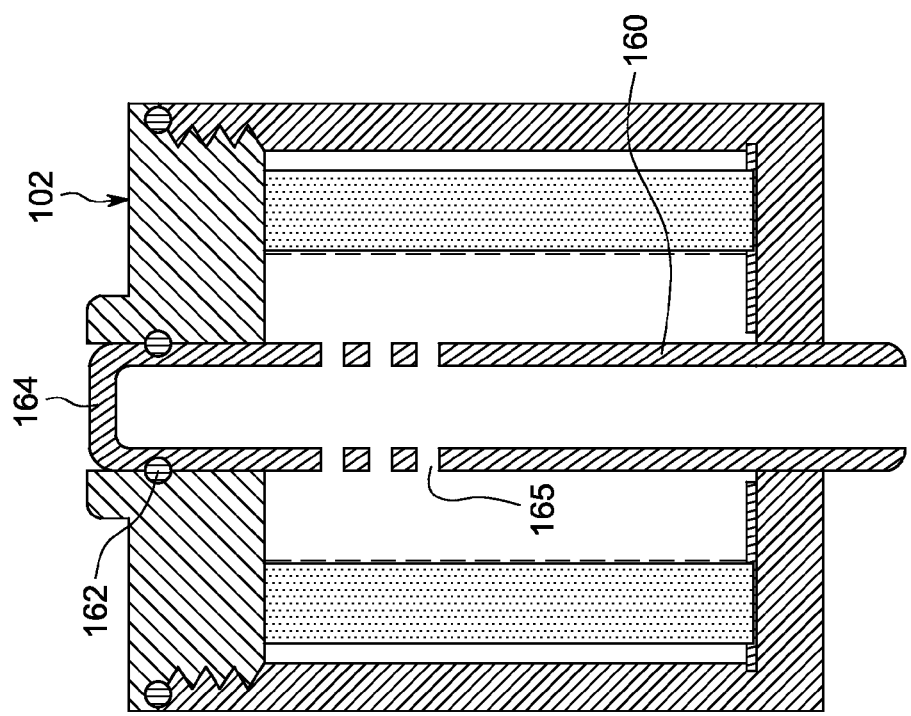

FILTER ELEMENT WITH A COMBINED ENDPLATE/LID WITH A CENTRAL HOLE

FIELD

A filter element that is removably installable within a filter housing for filtering a fluid is described. The filter element has a combined filter media endplate/housing lid with a central hole that can provide a number of functionalities.

Background

The use of inappropriate replacement filter elements is a growing problem for equipment operators and manufacturers. For example, in high pressure common rail fuel systems for diesel engines, fuel cleanliness specifications are extremely tight and specialized filters are required to maintain these conditions. The use of inappropriate filters with lower performance standards in place of the proper filter can lead to premature engine failure and, in extreme cases, result in increased warranty claims.

The design of filter elements to discourage intentional or inadvertent use of inappropriate filters, such as those with unacceptable removal characteristics, pressure drop or life, is known. Many such designs aim to prevent the use of inappropriate filter elements, or at the very least hamper the functionality of inappropriate filter elements.

Therefore, it is desirable to have a means to ensure that the proper filter is installed and used. It is further desirable that this means provide additional functionality to the filter or equipment, and that the design of the filter element be simplified.

Summary

A filter element is described that includes an endplate that also serves as the lid or cover for the filter housing. The combined endplate/lid includes a central hole that is closed to fluid flow when the proper filter element-housing combination is used. Various embodiments for different functional uses of the central hole are described.

The described filter elements discourage intentional or inadvertent use of inappropriate filter elements, such as those with unacceptable removal characteristics, pressure drop or service life. The described filter elements either prevent the use of inappropriate filter elements, or at a minimum, hamper the functionality of an installed inappropriate filter element. In the case of filter elements used in fuel applications, this can be achieved when fuel is prevented from flowing when an inappropriate filter element is installed and the engine cannot start. In the case of filter elements used in lubrication oil applications, installation of an inappropriate filter element should not oil starve the engine, so it is desirable that inappropriate filter elements not be able to be installed in the first place. The hole in the combined endplate/lid and/or other elements of the described filter elements provide additional functionality to the filtration system, such as air bleeding, sensor mounting, or other functionality. In addition, by combining the endplate and the lid, the design of the filter element is simplified compared to using separate endplate and lid.

The filter elements described herein can be used in a number of applications for filtering many types of fluids. Examples of applications include, but are not limited to, filtering of hydrocarbon based fuels such as diesel fuel, lubrication oil, and hydraulic fluid. Therefore, the filter elements can be referred to as fuel filter elements, lubrication oil (or oil) filter elements, hydraulic fluid filter elements, and the like.

In one embodiment, a filter element includes filtration media arranged into a ring having a first end and a second end and circumscribing a central cavity having a longitudinal axis. A first endplate is sealingly attached to the first end of the filtration media, and a combined endplate/housing lid is sealingly attached to the second end of the filtration media. The combined endplate/housing lid includes a central hole through the combined endplate/housing lid that is in fluid communication with the central cavity and an exterior of the filtration media, a protrusion that projects above a top surface of the combined endplate/housing lid in a direction away from the central cavity and away from the first endplate. The combined endplate/housing also includes a detachable connection mechanism that is used to detachably attach the combined endplate/housing lid to a housing that is configured to receive the filter element. In one embodiment, the central hole extends through the protrusion.

In another embodiment, a filter assembly includes a filter housing and the filter element is removably disposed in and detachably attached to the filter housing. The filter element can be disposable or reusable. At the end of the service life of the filter element, the filter element can be detached and removed from the filter housing, disposed of (or cleaned), and a new filter element (or the cleaned filter element) installed in the filter housing.

The central hole in the combined endplate/housing lid can be used for a number of purposes to add or enhance functionality to the filter element. For example, the central hole can be used as an air vent to vent air from the filter assembly. In another example, the central hole can be used to mount one or more sensors, such as a pressure or a temperature sensor. In another example, the central hole mounts a priming indicator to indicate whether the filter is primed.

DRAWINGS

FIG. 1A illustrates one embodiment of a filter element with combined endplate-lid with internal threads attached to a filter housing.

FIG. 1B illustrates another embodiment of a filter element with combined endplate-lid with external threads attached to a filter housing.

FIG. 3A illustrates the filter element of FIG. 1B interacting with a filter housing standpipe having a sealed end.

FIG. 3B illustrates the filter element of FIG. 1B interacting with a filter housing standpipe having an air vent opening.

Figure 2:
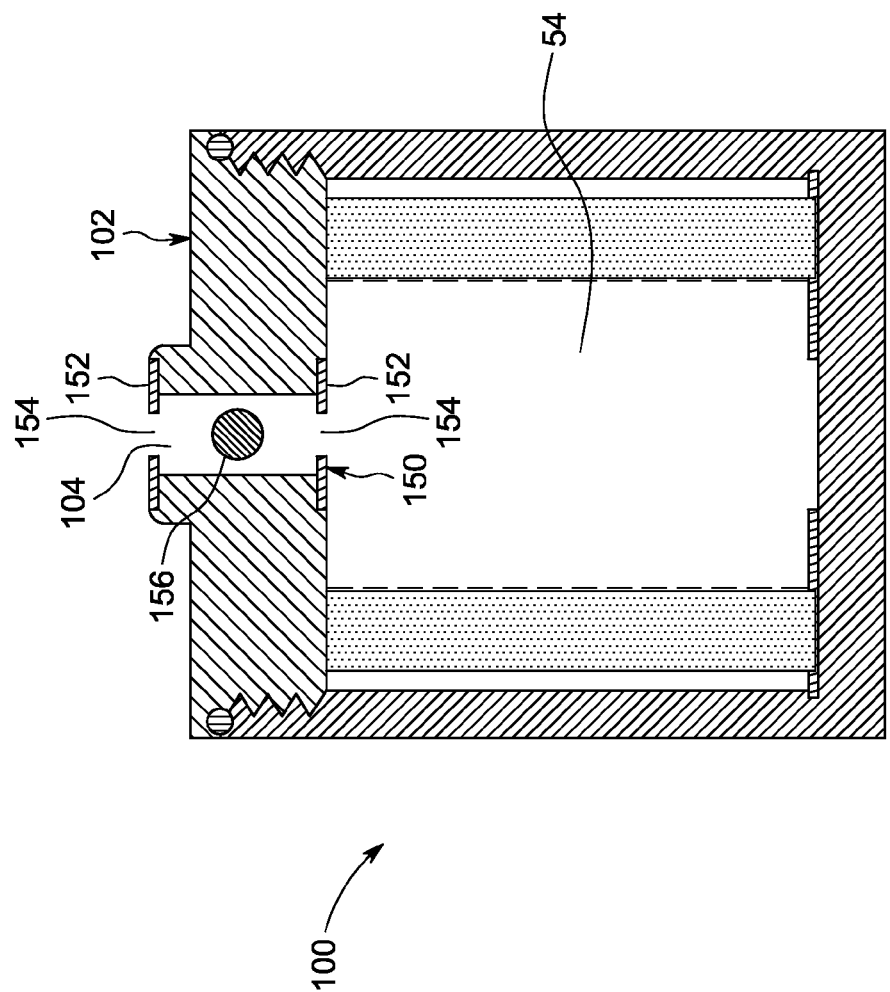
FIG. 2 illustrates the filter element of FIG. 1B showing one embodiment of using the central hole in the combined endplate-lid.

FIGS. 4A, 4B, 5A, and 5B illustrate a filter element with combined endplate-lid described herein having a priming visual indicator.

DETAILED DESCRIPTION

FIGS. 1A and 1B illustrate two exemplary filter elements 10, 100 each having a combined endplate/filter housing lid 12, 102 with a central hole or opening 14, 104. As shown, the filter elements 10, 100 can be removably disposed in and detachably attached to housings 20, 120 using a suitable form of detachable connection mechanism to form filter assemblies. In the illustrated examples, the detachable connection mechanism is illustrated as being either internal threads 22 (FIG. 1A) or external threads 122 (FIG. 1B), which engage with corresponding threads on the housings. At the end of the useful life of the filter elements 10, 100, or at any time prior thereto, the filter elements 10, 100 can be disconnected and removed from the housings, disposed of, and new filter elements 10, 100 installed. Alternatively, in the case of a re-usable filter element, the filter element can be removed, cleaned, and reinstalled.

In each of FIGS. 1A and 1B, the housing or module casting 20, 120 is illustrated in simplified form without showing the inlet, outlet, etc. Each of the housings 20, 120 is generally cylindrical in construction and includes an end wall 40 forming a closed end of the housing, and a side wall 42 extending upwardly from the end wall to an open end 44. The housings 20, 120 can be made from, for example, metal or plastic.

The filter elements 10, 100 are also generally cylindrical in construction and are configured to be removably disposed within the housings 20, 120 and removably attached to the housings 20, 120. In the illustrated examples, the threads 22, 122 on the combined endplate/lid 12, 102 engage with threads formed on the housing 20, 120 at the open ends 44 thereof to detachably secure the filter element to the housing. In addition to having threads, both the internal and external thread endplate/lid 12, 102 extend beyond the inner diameter of the housing 20, 120 to reduce external contamination of the fluid during filter service. Although the use of threads to detachably connect the combined endplate/lid 12, 102 and the housings 20, 120 has been described, other forms of detachable connection mechanisms between the combined endplate/lid 12, 102 and the housings 20, 120 can be used, such as ramps or bayonet-style connections or other non-threaded type connections.

In addition, the endplate/lid 12, 102 includes a protrusion 24, 124 such as a hexagonal shape nut integrally formed with the endplate/lid 12, 102, to facilitate rotation of the endplate/lid during installation and removal for ease of service. In the illustrated examples, the protrusion 24, 124 is located at the center of the endplate/lid surrounding the hole 14, 104 (i.e. the hole 14, 104 extends through the protrusion 24, 124) and extends above the upper surface of the endplate/lid in a direction away from the central cavity of the filter element and away from the endplate at the other end of the filter element. However, the protrusion 24, 124 (or multiple protrusions) can be located at other locations on the endplate/lid that are accessible by a service technician to rotate the endplate/lid during installation and removal.

Potential functions for the central hole 14, 104 in the combined endplate/lid 12, 102 are discussed later. In some embodiments, the hole 14, 104 is not centrally located coaxial to the longitudinal axis A-A. Instead, the hole 14, 104 can be offset from the axis A-A, yet still opening into and in fluid communication with the central cavity 54.

The combined endplate/lid 12, 102 is sealed with the housing 20, 120 via one or more seals 26. The seals 26 illustrated in FIGS. 1A and 1B are O-rings that form axial seals between the endplate/lid and the sidewall 42 of the housing at the open end 44. However, other configuration of seals that form other types of seals, including radial seals, can be used.

The filter elements also include filter media 28, for example in the form of a ring of filtration media having a first end 50 and a second end 52 and circumscribing a central cavity 54 having a longitudinal axis A-A. Optionally, a perforated center tube 30 supports the interior of the filter media 28 to prevent it from collapsing during outside in flow. In low pressure applications or when the flow of the fluid is inside out, it may not be necessary to use the perforated center tube 30, as the media may have sufficient strength to avoid collapse in the case of outside in flow.

A first or bottom endplate 32 is sealingly attached to the first end of the filtration media 28, for example by using an adhesive or embedding the media 28 into the endplate 32. In the illustrated embodiment, the endplate 32 includes an opening 34 therethrough so that it is open to fluid flow. It should be noted that for the sake of brevity, FIGS. 1A, 1B and 2 do not show the fluid outlet for the housing nor the manner in which the first endplate 32 seals to the housing. There are multiple ways of doing this, such as the use of axial or radial seals known to those of ordinary skill in the art. However, in some embodiments, the endplate 32 is closed, without the opening 34, so that the endplate 32 is not open to fluid flow.

The combined endplate/lid 12, 102 is sealingly attached to the second end of the filtration media 28 for example by using an adhesive or embedding the media 28 into the endplate 12, 102.

The combined endplate/lid 12, 102 and the endplate 32 can be formed from the same or different materials. For example, the combined endplate/lid 12, 102 and the endplate 32 can each be formed of, for example, metal or plastic material.

To facilitate the description and for the sake of brevity, FIGS. 2-4 only show and describe the external thread version of the filter element 100. However, it is to be understood that the concepts described in FIGS. 2-4 could be used on the filter element 10, and on other filter elements, as well.

FIG. 2 illustrates the central hole 104 being used to house an air vent/bleed mechanism 150 that is connected to and part of the filter element 100. Cage elements 152 are located at or near the top and bottom of the central hole 104 and include openings 154 therein so that the central cavity 54 of the filter element 100 can be in fluid communication with an exterior of the filter assembly. The cage elements 152, together with the sides of the endplate 102 that form the central hole 104, form a cage to retain a ball or other functionally-shaped float 156 within the central hole 104. The density of the ball 156 is such that while the filter housing is filling with fluid to be filtered, air bleeds from the filter assembly through the air vent/bleed mechanism 150. When the fluid fills the filter assembly such that it starts to fill the central hole 104, the ball floats on the fluid and seals in the top opening 154 of the upper cage element 152 to prevent escape of fluid. The air vent mechanism described herein is exemplary only, it being understood that other types of air vents are possible.

FIGS. 3A and 3B illustrate embodiments in which the central hole 104 is used to seal on an extended standpipe 160. The standpipe 160 is attached to the housing and is intended to be a permanent part of the housing. The standpipe 160 extends along the longitudinal axis A-A from the end wall 40 toward the open end 44, and an end of the standpipe 160 extends into the central hole 104. An o-ring or other radial seal 162 is provided to seal between the standpipe 160 and the endplate/lid 102, but other sealing means are possible. With this design, any filter element that lacks a central hole of appropriate size and lacks an appropriate sealing mechanism will either leak or be prevented from being installed into the filter housing by the standpipe 160. Openings 165 in the sides of the standpipe 160 permit fluid to enter the standpipe which leads to an outlet to one or more downstream components that receive the fluid.

In FIG. 3A, the standpipe 160 has a closed upper end 164, so the main function of the hole-standpipe-seal is to ensure that only appropriate filter elements can be installed. In the embodiment shown in FIG. 3B, an air vent/bleed mechanism 166 is built into the top of the standpipe. In the mechanism 166, openings 168 are formed in opposing walls of the standpipe 160, and a floating ball 170 is disposed or caged between the walls and the side wall of the standpipe. So in the embodiment illustrated in FIG. 3B, the cage and air vent/bleed mechanism 166 is part of the standpipe, but the mechanism 166 is otherwise similar in design and function to the air vent/bleed mechanism 150 in FIG. 2, with air to be vented entering the standpipe via the openings 165 during filling of the filter housing by the fluid. In an embodiment, the air vent mechanism is not integral with the standpipe, but is instead separate from the standpipe.

Figure 4A:
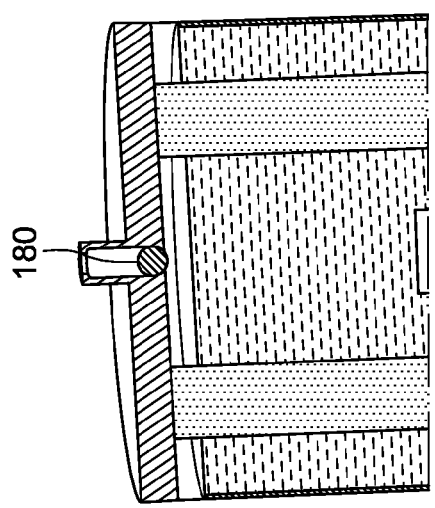
Figure 4B:
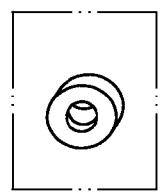

FIGS. 4A, 4B, 5A and 5B illustrate an embodiment in which a ball 180 or other float element that is disposed in the central hole (similar to that shown in FIG. 2) is used as a visual indicator to visually indicate if a filter element is primed properly or not. FIGS. 4A and 4B show a not fully primed condition where liquid is inside the housing and the filter element, but not completely filling the housing, so that an air gap exists between the liquid and the combined endplate/lid. The ball 180 in the central hole is of higher density than that of air, so the ball sits at the bottom stop of the central hole and is not visible prominently while looking at the combined endplate/lid from above as shown in FIG. 4B.

Figure 5A:
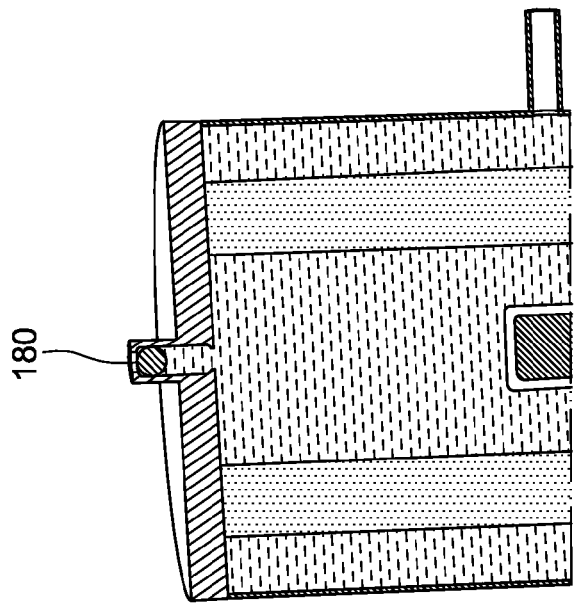
Figure 5B:
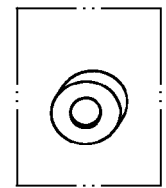

With reference to FIGS. 5A and 5B, when the housing is completely filled with liquid so the filter assembly is fully primed, the ball 180, having a lower density than the liquid, floats and seals against the top stop in the central hole. This causes the ball to be prominently visible from the top as best seen in FIG. 5B and is then used as a visual indicator to confirm that the housing and filter element are fully and correctly primed.

Other means to use the central hole to add or enhance functionality to the filter element are also possible. For example, the central hole can be used to mount pressure or temperature sensors.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter element, comprising:
   filtration media arranged into a ring having a first end and a second end and circumscribing a central cavity having a longitudinal axis;
   a first endplate sealingly attached to the first end of the filtration media;
   a housing lid sealingly attached to the second end of the filtration media so as to form a second endplate, the housing lid includes:
      a hole extending through the housing lid, the hole opens into and is in fluid communication with the central cavity, and the hole is in fluid communication with an exterior of the filtration media;
      a protrusion that projects above a top surface of the housing lid in a direction away from the central cavity and away from the first endplate;
      a detachable connection mechanism that detachably attaches the housing lid to a housing that is configured to receive the filter element, and
      a float installed in the hole that is movable within the hole in a direction that is substantially parallel to the longitudinal axis.

2. The filter element of claim 1, wherein the hole has an axis that is parallel to the longitudinal axis.

3. The filter element of claim 1, wherein the detachable connection mechanism comprises threads formed on the housing lid.

4. The filter element of claim 3, wherein the threads are internal threads that face inwardly toward the central cavity or external threads that face outwardly away from the central cavity.

5. The filter element of claim 1, further comprising an air vent mechanism installed in the hole, the air vent mechanism includes the float.

6. The filter element of claim 5, further comprising a radial seal installed within the hole.

7. The filter element of claim 1, wherein the filter element is configured to filter fuel or filter oil.

8. The filter element of claim 2, wherein the axis of the hole is coaxial to the longitudinal axis, and the hole extends through the protrusion.

9. A filter assembly, comprising:
   a filter housing having a closed end, an open end, and a housing detachable connection mechanism at the open end;
   a filter element removably installed within the filter housing, the filter element includes:
   a ring of filtration media having a first end and a second end and circumscribing a central cavity having a longitudinal axis;
   a first endplate sealingly attached to the first end of the filtration media;
   a housing lid that is detachably fixed to the filter housing at the open end thereof and that closes the open end, the housing lid is sealingly attached to the second end of the filtration media so as to form a second endplate, and the housing lid includes:
      a hole extending through the housing lid, the hole opens into and is in fluid communication with the central cavity, and the hole is in fluid communication with an exterior of the filtration media;
      a protrusion that projects above a top surface of the housing lid in a direction away from the central cavity and away from the first endplate;
      a filter element detachable connection mechanism engaged with the housing detachable connection mechanism detachably securing the filter element to the filter housing, with the housing lid closing the open end; and
      a float installed in the hole that is movable within the hole in a direction that is substantially parallel to the longitudinal axis.

10. The filter assembly of claim 9, wherein the hole has an axis that is parallel to the longitudinal axis.

11. The filter assembly of claim 9, wherein the filter element detachable connection mechanism comprises threads, and the threads are internal threads that face inwardly toward the central cavity or external threads that face outwardly away from the central cavity.

12. The filter assembly of claim 9, further comprising an air vent mechanism installed in the hole, the air vent mechanism includes the float.

13. The filter assembly of claim 12, further comprising a radial seal installed within the hole.

14. The filter assembly of claim 10, wherein the axis of the hole is coaxial to the longitudinal axis, and the hole extends through the protrusion.

15. The filter assembly of claim 9, wherein the filter housing includes a standpipe that extends along the longitudinal axis from the closed end toward the open end, and the standpipe extends into the hole; and a seal that seals between the standpipe and the housing lid.

16. The filter assembly of claim 15, wherein an end of the standpipe that extends into the hole includes an air vent mechanism, the air vent mechanism includes the float.

17. The filter assembly of claim 9, wherein the filter element is configured to filter fuel or filter oil.

* * * * *